UNITED STATES PATENT OFFICE.

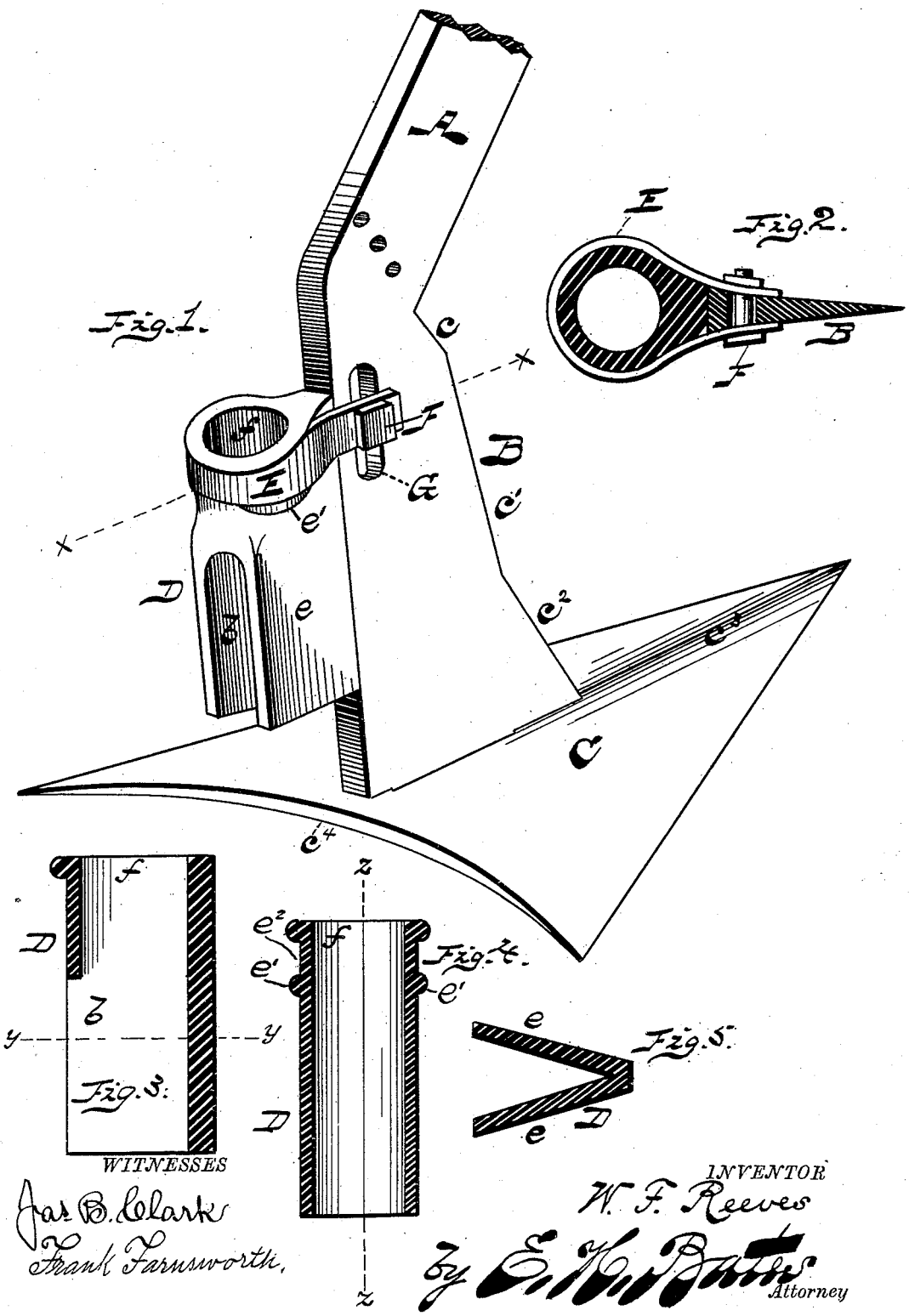

WILLIAM F. REEVES, OF MILTONVALE, KANSAS.

COMBINED SUBSOILER AND PLANTING ATTACHMENT.

SPECIFICATION forming part of Letters Patent No. 354,231, dated December 14, 1886.

Application filed September 25, 1886. Serial No. 214,532. (No model.)

*To all whom it may concern:*

Be it known that I, WILLIAM F. REEVES, a citizen of the United States, residing at Miltonvale, in the county of Cloud and State of Kansas, have invented certain new and useful Improvements in Combined Subsoilers and Planting Attachments; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in combined subsoilers and planting attachments, which are provided with an adjustable seed-guide and the whole adapted to be attached to a cultivator provided with means for dropping corn, or to a seeder, whereby grain may be delivered from a seed-box to the loose earth formed by said plow and subsoiler, all of which will be hereinafter fully explained.

Figure 1 of the drawings represents a perspective view of my subsoiler. Fig. 2 is a horizontal sectional view taken on line $x\ x$, Fig. 1. Fig. 3 is a vertical section taken on line $z\ z$, Fig. 4. Fig. 4 is a transverse vertical section of the guide-spout, and Fig. 5 is a horizontal section taken on line $y\ y$, Fig. 3.

Referring by letter to the drawings, A designates the standard, which is designed to be attached to a lister-plow in rear of the shovel in any suitable manner. The lower part of the standard A forms a colter, B, having the front cutting-edge, $c'$, and the abrupt cutting-edge $c^2$ and $c$, which are in a vertical plane with the horizontal ridge $c^3$ of the subsoiler-blade C. The subsoiler is arc-shaped, and is tapered from its center $c^4$ laterally and forwardly, thus forming a concavity on its under side, to which blade the lower end of the colter is secured.

D represents the feed or guide for the grain, having the open top $f$ to receive a tube which leads from the seed-box, and through which the same passes to the open discharge end $b$ of the guide and is deposited in loose soil formed by the plow and subsoiler, which will be hereinafter described.

The discharge-guide D has diverging sides $e$ and ribs $e'$, between which is a space, $e^2$, in which a strap, E, is placed, through the ends of which a bolt, F, is passed, and also through a slot, G, in the colter B, whereby the guide may be raised or lowered, as desired.

It is designed to secure the bar A in rear of a drill-tooth or plow in any suitable manner, and connect the guide D to the seed-box by a tube, and when the furrow has been opened by the plow to give a sufficient depth, then follows the subsoiler, which loosens up the earth in the bottom of the furrow, and in this loose earth the grain is deposited by passing from a seed-box, through a tube, into the seed-guide, and out the bottom thereof. By this means of depositing the seed in loosened earth at the bottom of the furrow it will germinate quicker and stronger than if it were deposited on the solid bottom of the furrow.

I am aware that it is not new to hinge a dropping-tube in rear of a colter; nor is it new to adjustably secure to the lower end of a plow-standard a subsoil-plate. I therefore broadly disclaim such devices.

What I claim is—

The combination of the standard A and vertically-slotted colter B, formed of a single piece, the subsoil-blade C, secured to the sole of the colter, the vertically-adjustable tubular guide D, having an opening, $b$, through its back, backwardly-diverging sides $e\ e$, ribs $e'$ near its upper end, and the strap and bolt securing this guide to the vertical back of the colter, all as described and shown.

In testimony whereof I affix my signature in presence of two witnesses.

WILLIAM F. REEVES.

Witnesses:
JAMES MCARTHUR,
J. G. CUSHMAN.